(No Model.) 8 Sheets—Sheet 1.

G. A. FAAS.
MACHINE FOR MAKING AND STICKING MATCH SPLINTS.

No. 292,423. Patented Jan. 22, 1884.

(No Model.)  8 Sheets—Sheet 2.

G. A. FAAS.
MACHINE FOR MAKING AND STICKING MATCH SPLINTS.

No. 292,423.  Patented Jan. 22, 1884.

Fig. 2.

Attest:  Inventor.

(No Model.) 8 Sheets—Sheet 7.

G. A. FAAS.
MACHINE FOR MAKING AND STICKING MATCH SPLINTS.

No. 292,423. Patented Jan. 22, 1884.

Attest:
Edmond Brodhag
Howell Battle

Inventor:
Gus. A. Faas
by his Attys
Johnson & Johnson (No Model.) 8 Sheets—Sheet 8.

G. A. FAAS.

MACHINE FOR MAKING AND STICKING MATCH SPLINTS.

No. 292,423. Patented Jan. 22, 1884.

Attest:
Edmond T. Brodhag
Howell Battle

Inventor.
Gus. A. Faas
by his Attys
Johnson and Johnson

UNITED STATES PATENT OFFICE.

GUSTAV A. FAAS, OF LAWRENCE, KANSAS, ASSIGNOR OF ONE-FOURTH TO ARTHUR P. USHER, OF SAME PLACE.

MACHINE FOR MAKING AND STICKING MATCH-SPLINTS.

SPECIFICATION forming part of Letters Patent No. 292,423, dated January 22, 1884.

Application filed August 22, 1883. (No model.)

*To all whom it may concern:*

Be it known that I, GUSTAV ADOLPH FAAS, a citizen of the United States, residing at Lawrence, in the county of Douglas and State of Kansas, have invented new and useful Improvements in Machines for Making and Bundling Match-Splints, of which the following is a specification.

In the organization of my machine for making and sticking match-splints, they are produced from a suitable strip or piece of wood fed endwise to a gang of saws, which divide the end of the wood with the grain, the divisions being separately supported and severed by lateral spur-cutters, between which and the cutter-plates the splints are caused to be forced up as the saws and cutters descend, and held in position to be seized and held by a dipping-frame during the ascending and descending movements of the saw-carrying cross-head, and the splints automatically clamped and held between seizing-bars placed crosswise within the dipping-frame, parallel to each other, adapted to be opened in succession to receive and clamp the rows of splints as they are successively produced by the continuous operation of the machine.

My invention consists of the several combinations of devices which constitute the organized machine whereby the results above stated are effected, and which will be hereinafter described in connection with illustrations of said machine, preparatory to a proper designation of the organization of devices and combinations of parts claimed as my invention.

Referring to the accompanying drawings, Fig. 6 represents the cross-head, showing the saws and the side spur-cutters formed upon the saw-plates above the saw-teeth; Fig. 6$^a$, a cross-section of the same on the line $x\,x$ of Fig. 6. Figs. 7 and 8 represent a cross-section and top view of the table-bed upon which the splints are supported while being severed by the spur-cutters. Fig. 9 represents the cap-plate placed over the stuff in front of the saws.

Figures 1, 17:
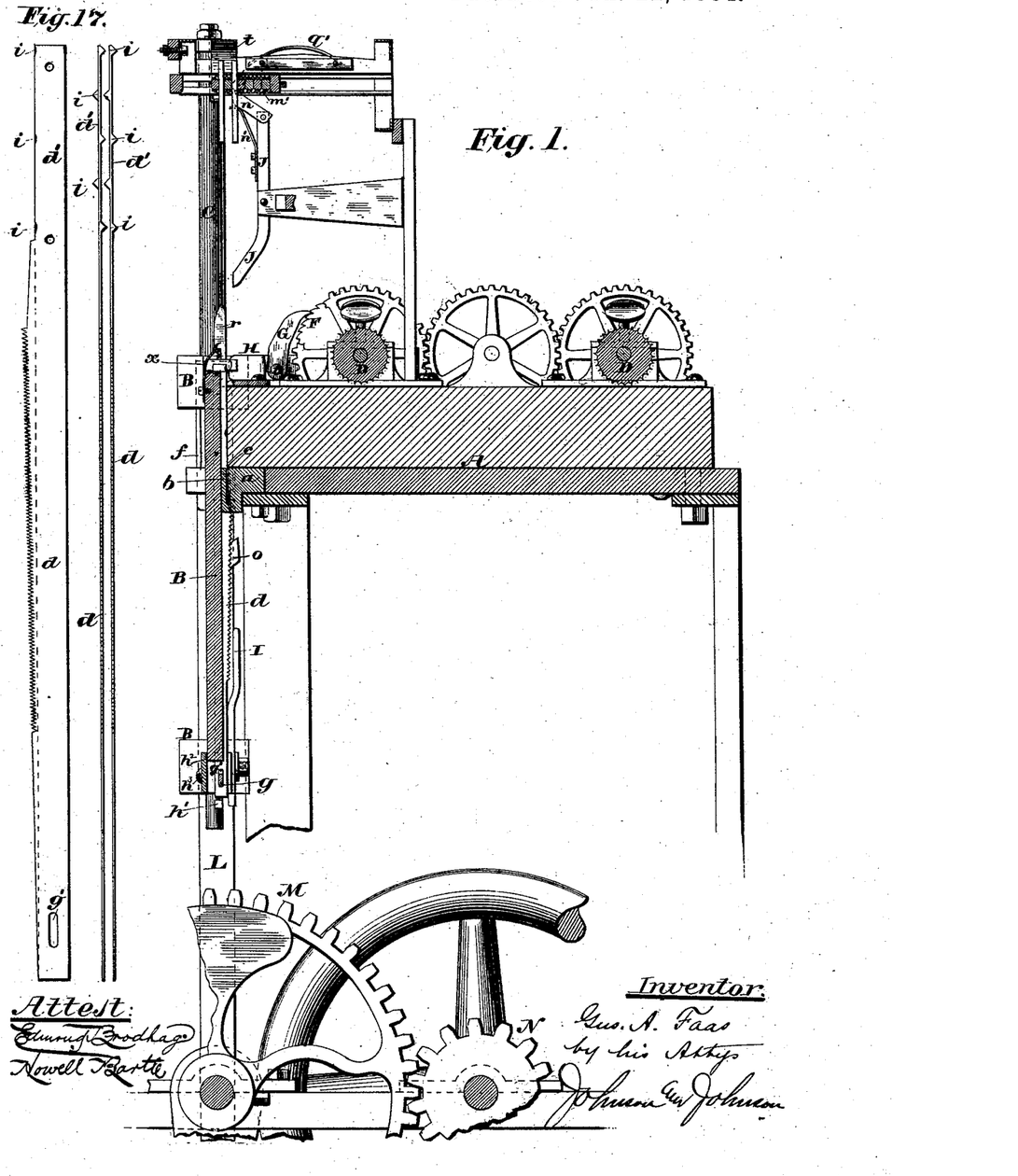
Figure 1 represents a vertical longitudinal section of the machine, the cross-head carrying the splint-cutting mechanism being shown at the limit of its downward movement.
Fig. 17 represents a side view of the saw-blade and cutter-plate and an edge view of the same.
Figure 2:
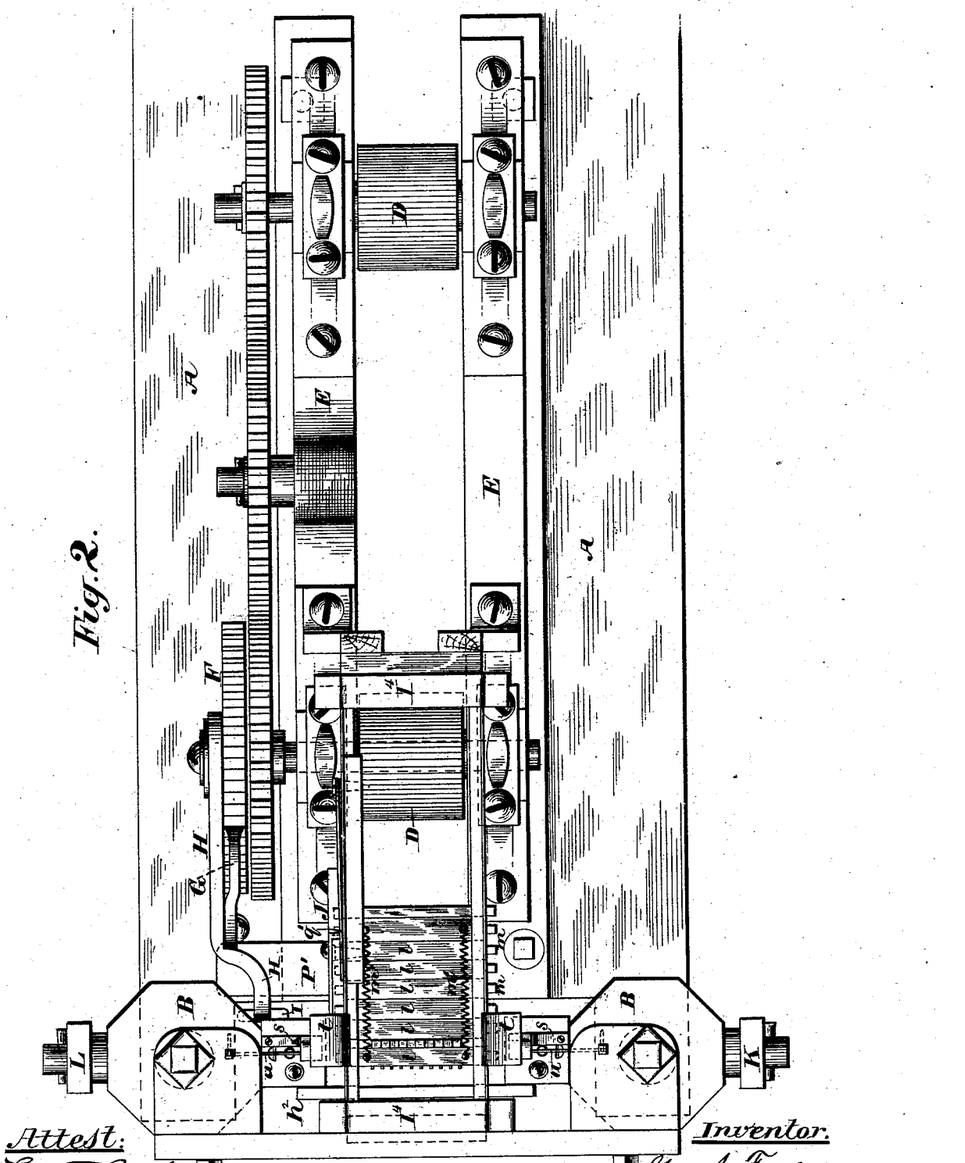
Fig. 2 represents a top view of the machine.
Figure 3:
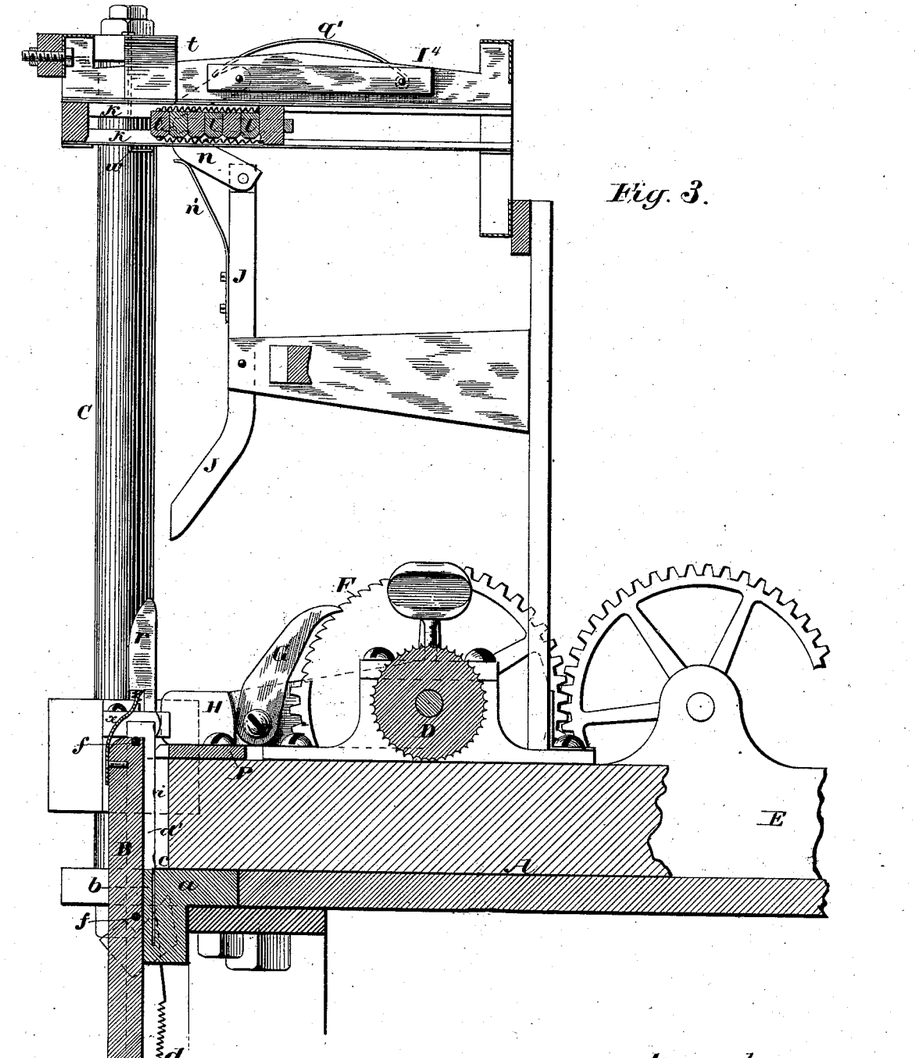
Fig. 3 represents a vertical section, the cross-head carrying the splint-cutting mechanism being in the position shown in Fig. 1.
Figure 4:
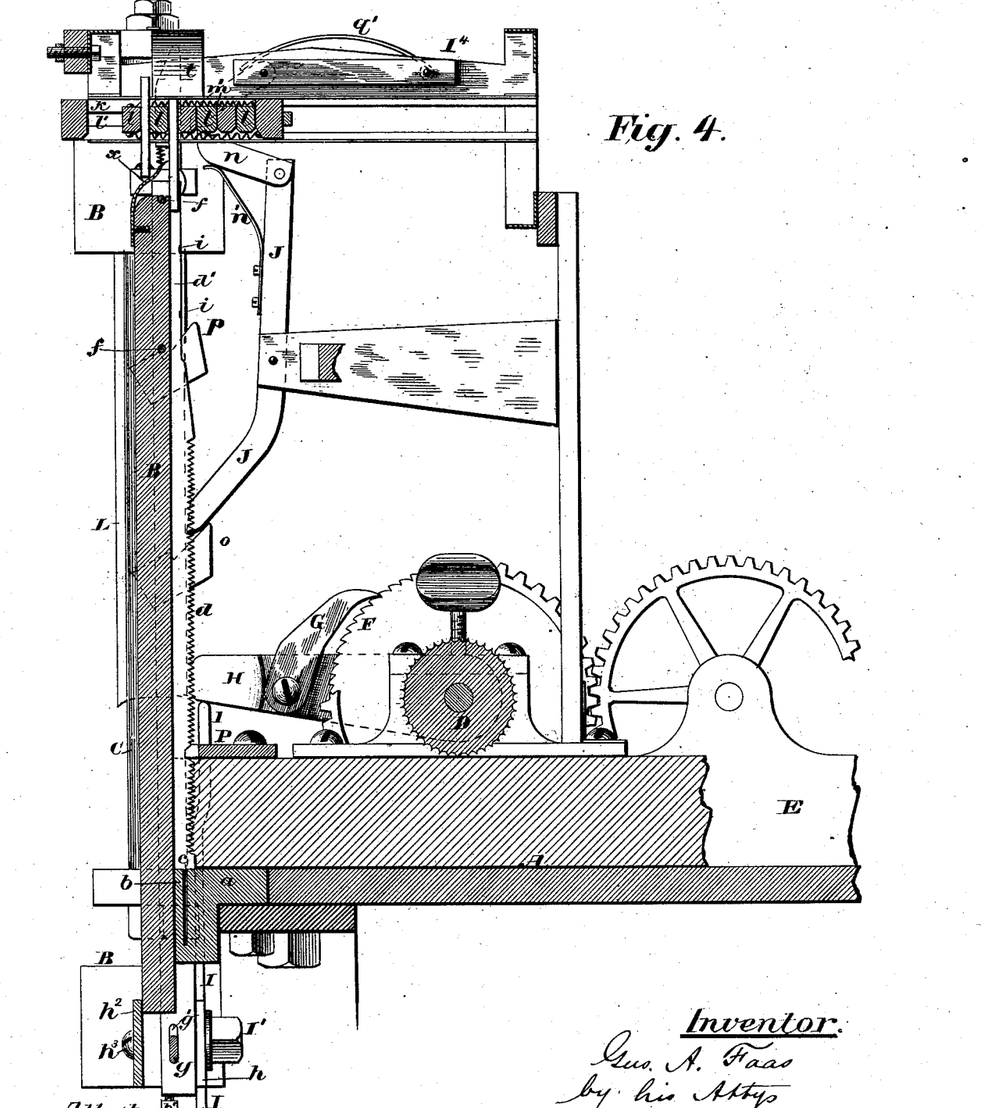
Fig. 4 represents a vertical section, the cross-head carrying the splint-cutting mechanism being shown at the limit of its upward movement, and the match-splints shown as having been cut and carried up between the seizing-bars of the dipping-frame.

Any suitable construction of frame may serve to support the operating mechanism, the feeding mechanism being mounted upon a table, the splint-producing gang of saws and cutters being carried by a vertically-reciprocating cross-head at the end of the table, and a dipping-frame supported above the table in position to receive the splints direct from between the cutter-plates of the cross-head, which cutter-plates serve as holders for the splints to carry and place them into a dipping-frame by the ascending movement of the reciprocating cross-head, the several operations of feeding the stuff, producing the splints, and placing them within a dipping-frame, being automatic. The splints are produced from a piece or strip of wood of a thickness equal to the length of the match-splint and of a width equal to the number of saws of the gang, and it is fed upon the table between guides to the vertically-operating saws, so that the splints are cut in layers from the end of the wood, as shown in Figs. 1, 3, and 4. In this operation the end of the splint-wood is divided by a series of vertical cuts by the descent of the saws, and each division is cut from the wood by the action of lateral spur-cutters placed above and between the saw-blades and descending with them. In the action of the spur-cutters each splint, as it is cut, is separately supported, and held in the position in which it was cut at the top of the saw-frame or cross-head for presentation to the seizing dipping-frame.

It is a distinguishing feature in the operation of the machine that the splints are produced by the descending movement of the saw-frame, held in separate position thereby, and presented automatically thereby upon the ascending movement of the saw-frame or cross-head into a device adapted to seize the upper ends of the splints and hold and take them from between the cutter-plates as the saw-frame descends for the next cut. In this operation the support for the separate splints forms an important matter, and it consists of a metal bed, $a$, suitably seated at the end of the table A, forming a part of it, having vertical grooves on its outer face to receive the saws and form the supports $b$ for the splints between the saw-blades, and having also a vertical slit, $c$, crossing the supporting divisions $b$ parallel with the vertical face of the bed $a$, but not extending to its bottom, to receive the lateral spur-cutters in their movement below the surface of the table-bed sufficient to effect the cutting of the splints from the end of the wood, and to allow of the full movement of the saw-frame or cross-head. Each division $b$ of the bed forms a separate support for each splint as it is cut, and has the form in cross-section of the splint.

Figure 5:
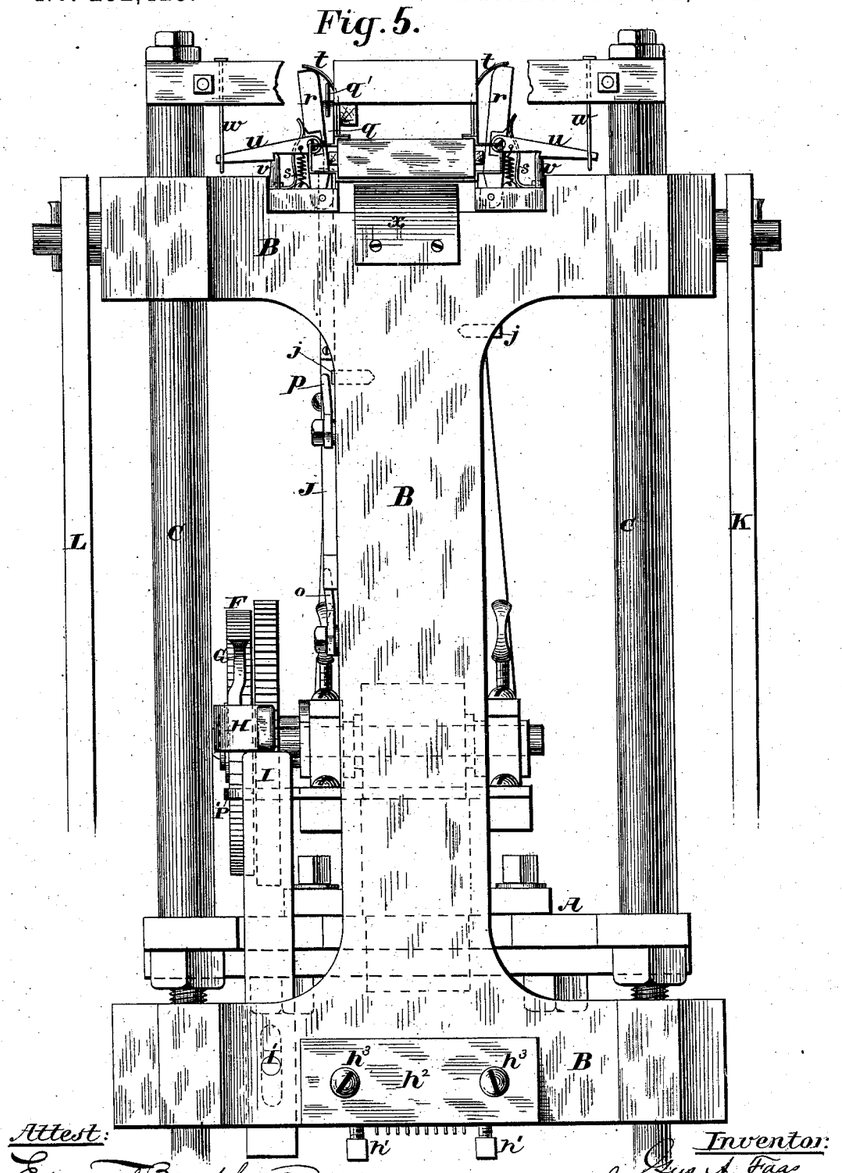
Fig. 5 represents a front view of the parts in the position shown in Fig. 4.
Figures 6, 6A, 7, 8, 9:
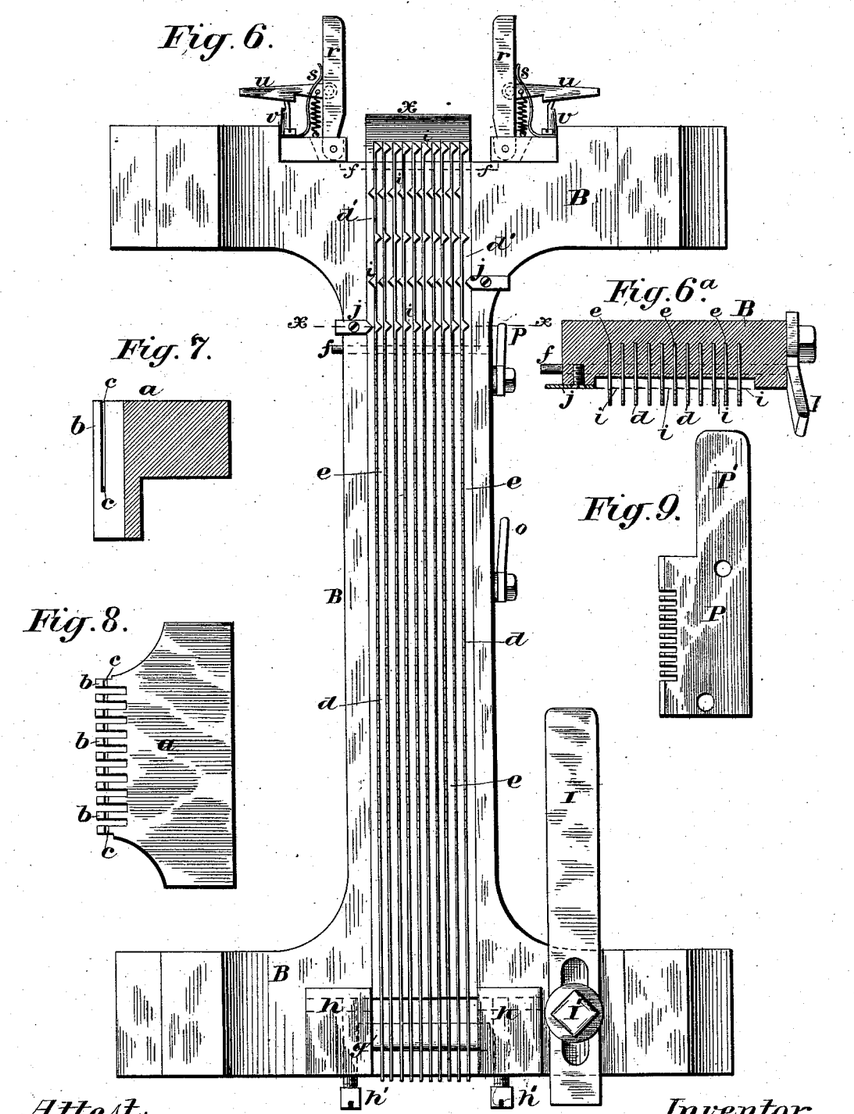

The saw-frame consists of an I-shaped cross-head, B, preferably of a single casting, mounted for vertical reciprocation upon guides C C, suitably secured in the table or frame, so that the saws will work within the grooves of the metal bed $a$. The saws $d$ are secured in a gang within a recess in the face of the vertical body of the cross-head in such manner as to project forward at their upper ends, so that their teeth will stand obliquely to a vertical line and cut into the end of the wood as it is fed forward a depth equal to such oblique projection. The saw-blades are supported throughout their length by being fitted within grooves $e$, Fig. 6$^a$, in the recessed face of the cross-head, and they are confined within the grooves near their upper ends by one or more rods, $f$, passed through the cross-head and the saw-blades near their upper ends, and by a bottom stretcher-bar, $g$, passed through slots $g'$ in the saw-blades and into recesses in blocks $h\ h$, which are adjusted vertically by screws $h'\ h'$, passing through threaded openings in said blocks and abutting against the lower end of the cross-head, which is recessed for that purpose, as shown in Fig. 6. The saws are secured in the cross-head so as to be removed for repairs, and for renewal when necessary. At their lower ends they are secured by the stretcher-bar to the blocks $h\ h$, which are confined to the cross-head by the plate $h^2$ on one side, secured by the screws $h^3$, and by a flange-extension from the blocks $h$ on the other side of the cross-head, as shown in Figs. 4, 5, and 6. The saws can be removed by driving out the cross-pin $f$ and removing the plate $h^2$ and stretcher-bar $g$. This construction renders it very convenient for removing, replacing, and securing the saws. The extent of obliquity of the cutting-line of the saws is sufficient to give a depth of cut a little greater than the thickness of the splint, so that the spur-cutters will only have to cut through each side of the divisions to sever the splints.

The lateral spur-cutters $i$ are preferably formed upon the saw-blades $d'$, which for that purpose are made long enough to extend above the saw-teeth and terminate at or a little above the top of the cross-head. The spur-cutters are preferably of V shape, formed upon the edges of the saw-blades $d'$, above the saw-teeth, so as to stand between the blades, there being two or more spur-cutters standing within the space on each side from one saw-blade, and two or more spur-cutters standing within said space from the other saw-blade; but the spurs of both saw-blades are in different horizontal cross-planes. Their cutting-points, therefore, can lap in a vertical plane to completely sever the splint. Spur-cutters $j$, for severing the outside splints, are secured upon the face of the cross-head and extend within the space formed between the vertical walls of the recess in the cross-head and the outside saw-blade of the gang, as seen in Fig. 6$^a$, and co-operate with the spur-cutters on the outside saw-blades to completely sever the outside splints.

While I do not confine myself to the forming of the spur-cutters upon the saw-blades, yet I prefer to so form them as they may be stamped out with the saw-blade, and afterward turned to one side at right angles to the blade, so as to form a combined saw and side cutter, the saws to cut divisions in the end of the wood and the side spur-cutters to sever the divisions from the wood, and to hold the severed splints between the cutter-saw plates in position to be seized and drawn out in rows by a dipping-frame upon the upward movement of the cross-head. It is important to notice that under this operation the spur-cutters must be placed so as to operate in a vertical plane with the cross-slit $c$ in the bed $a$, within which the two lower ranges of the lateral spur-cutters enter on the descent of the cross-head to complete the cut on both sides of the splint, and that the spur-cutters are arranged to operate above the saws in a vertical plane back of the cutting-edges of the saws, so that while severing the splints they are separately severed between the plates on which the spur-cutters are formed, separately held in the position in which they were cut, and carried by the cross-head to the limit of its upward movement, and there drawn out of their holders by the co-operating action of the seizing-bars of the dipping-frame and the descending movement of the cross-head, leaving the splints held above in said dipping-frame. The descending movement of the cross-head is limited, so that when it reaches its lowest point the severed splints will be held loosely between the cutter-plates above the table $a$, and their upper ends will project above their cutter-holding plates $d'$ a sufficient distance to be seized just at the limit of the ascending movement of the cross-head, so that its descent will cause the splints to be pulled out from between their holding-plates, as shown in Fig. 4.

The feeding mechanism for the splint piece or strip is arranged upon the table, and consists of two ribbed feed-rolls, D D, mounted upon two parallel guideways, E E, which extend back from the cross-head, and between which the wood is held and fed forward to the saws, the rolls being made adjustable to suit the thickness of the splint-piece. The rolls are connected for equal movement, and are operated by a ratchet-wheel, F, on the shaft of the feed-roll next to the saw-frame, and a ratchet-pawl, G, pivoted to an arm, H, hung upon the shaft of said roll, which is operated by an arm, I, adjustably secured to the cross-head in position to strike the end of the arm H on every ascending movement of the cross-head, and thus turn the rolls to give an intermittent feed. The extent of the feed of the wood can be regulated by adjusting the arm I up or down by a clamp-screw, I', passing through a slot in said arm.

The dipping-frame, as already stated, is arranged at the top of the machine, and is moved horizontally by an intermittent movement over the top of the cross-head, to receive the splints from it. It consists of an open rectangular frame having its side bars, $k$, slotted, and a series of bars, $l$, having shouldered ends fitted crosswise within the slots $l'$ of the side bars, so that said shouldered bars will lie horizontally across the open frame and be held in place in contact with each other and against the rear end of said frame, but not filling said frame, leaving a space, $k^2$, at its other end, to allow the bars to be opened from each other as the frame is fed to seize and hold the splints, as will be presently described. At their under sides the edges of these bars $l$ are beveled or rounded to allow, when the bars are opened, the free entrance of the ends of the splints between them. A tooth, $m$, is formed upon the ends of each seizing-bar $l$, so as to project beyond the side bars of the frame and form racks by which the dipping-frame is fed forward intermittently over the splint-holding cutter-plates of the cross-head. In their normal positions the bars $l$ are held in contact with each other and against the rear end bar, $k^3$, of the open frame by suitable springs, $m'$, attached to each end of the front bar of the series, and to the rear end bar, $k^3$, of said open frame on the upper and on the lower sides thereof; and the operation of the machine is such as to press open these bars in succession from the front one by pressure applied to their end teeth, $m$, in a manner to cause them to receive and clamp the rows of splints between them, and so hold each row until the frame is filled, the first row being clamped between the two front bars and each succeeding row between two bars of the series. The dipping-frame thus constructed is adapted to receive the splints as they are presented to said frame by the upward movement of the cross-head carrying the splint-cutter-holding plates. For this purpose the dipping-frame is mounted in a suitable horizontal guideway, $I^4$, properly supported at the top of the machine, within which said frame is intermittently fed forward over the vertical line in which the splints are presented to it.

The mechanism for effecting the feed of the dipping-frame and the manner of presenting the splints thereto to be seized or grasped will now be described.

Figure 10:
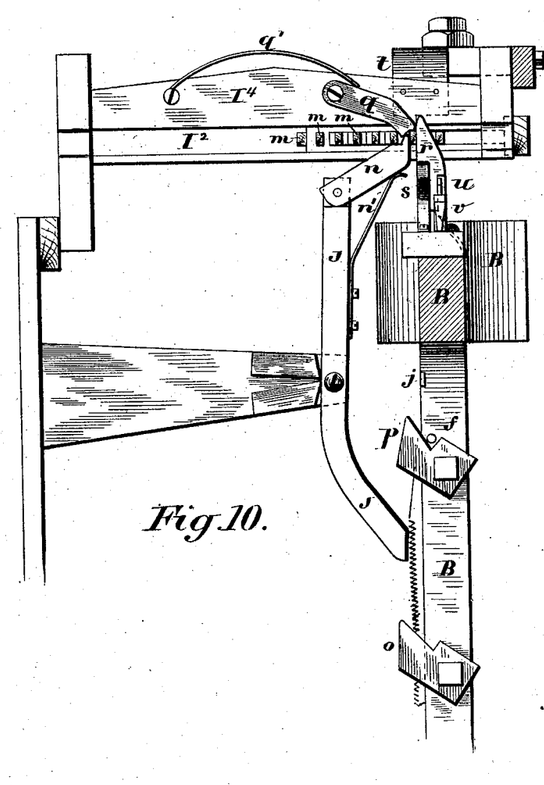
Fig. 10 represents a side view, showing the position of the feed device and of the cams when the latter are commencing to open one of the seizing-bars of the dipping-frame to receive the row of splints.
Figure 11:
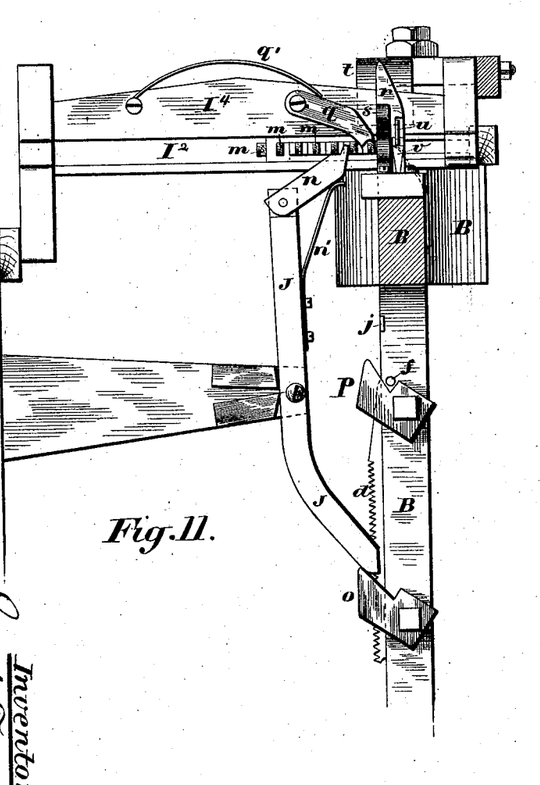
Fig. 11 represents a side view, showing the feed device in position to feed the dipping-frame forward over the cross-head to receive the next row of splints.
Figure 12:
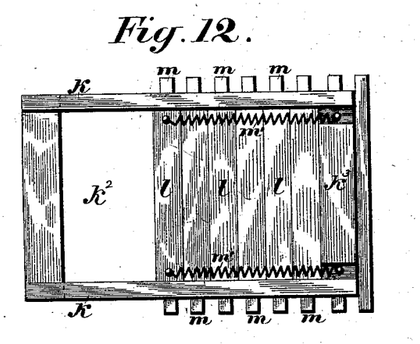
Fig. 12 represents a top view of the dipping-frame, showing the series of seizing-bars in their closed position.
Figure 13:
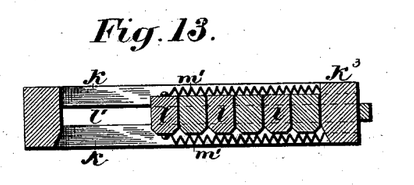
Fig. 13 shows a vertical section of the same.
Figure 14:
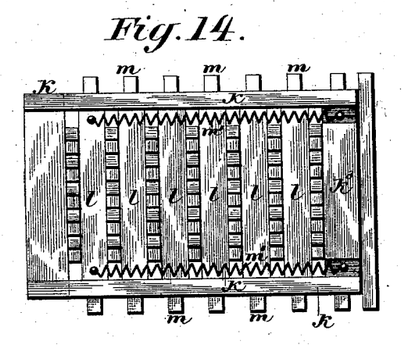
Fig. 14 shows a top view of the dipping-frame when filled with match-splints.
Figure 15:
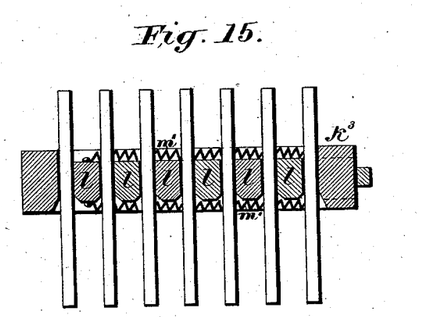
Figs. 15 and 16, a vertical longitudinal and cross section of the same.
Figure 16:
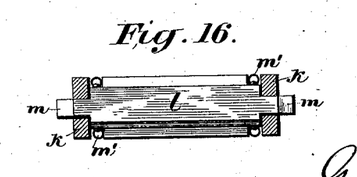

J represents a feed-bar, pivoted at or near the middle of its length to a suitable fixed part of the frame, so as to stand in a vertical position in front of the saw side cross-head, having a pawl, $n$, at its upper end supported and carried in a forwardly-inclined position by a spring, $n'$, arranged to constantly press the acting end of the pawl upward between the rack-teeth of the splint-seizing bars $l$, as shown in Fig. 10. The pawl is arranged to operate by the side of the guideway $I^4$, which is provided with slots $I^2$ in its sides, through which the rack-teeth of the seizing-bars project, so as to be acted upon by the pawl. The lower end of the feed-bar is bent or inclined forward in position to be struck by a tappet-arm, $o$, secured to the body of the cross-head, so as to vibrate the feed-bar to move the pawl back into the rack-teeth as the cross-head rises. A similar tappet-arm, $p$, is secured to the body of the cross-head above the tappet-arm $o$, in position to strike the bent end of the feed-bar, so as to vibrate it and move the pawl forward to feed the dipping-frame as the cross-head descends. An arm, $q$, pivoted to the side of the guideway, is adapted by a spring, $q'$, to press upon the teeth $m$, and to hold the dipping-frame in position while the pawl is moved back over the teeth; otherwise the dipping-frame might be carried back by the pawl and disarrange the proper position of its seizing-bars to receive the splints.

The rack-teeth, while serving the purpose stated, serve also another important function in the operation of delivering the splints into the dipping frame, the means for effecting which operation I will now describe.

To the top of the cross-head two cam-arms,

*r r*, are pivoted so as to stand in vertical positions with their cam ends uppermost, pointed at the top, and arranged in position to be carried up on each side of the guideway I⁴ and between the end projecting teeth, *m*, of the seizing-bars, to open them. In this position the cam-arms are each held by a spring, *s*, which tends to press it inward, and each cam-arm is pivoted so that it can be turned outward against the pressure of its spring. As the cross-head rises these cam-arms enter between the rack-teeth *m*, and as the front side of the arms has the cam form, the toothed bar in front of the cams will be caused to open from the toothed bar next behind it, and the row of splints held between the cutter-plates will be carried up into the space between these open bars, which will then, by the descent of the cross-head, be released from the cam-arms and close upon and clamp and hold the splints, so that the cross-head will descend, leaving the splints in the dipping-frame. As the upper ends of the row of splints have passed between the bars, the cam-arms, continuing to rise, strike against an inclined or curved projection, *t*, on the sides of the guideway, and are thereby turned outward to free their cam ends from between the teeth *m*, and thus allow the bars to close upon the splints, as stated. As the cam-arms are turned outward, as stated, they are so held free of the teeth *m* as the cross-head descends by a catch, *u*, hooking over a pin, *v*, on the cross-head, the catches *u* being released by striking a trip-arm, *w*, depending from the cap-bar of the frame, and thus leave the cam-arms in position to operate the seizing-bars on the next ascending movement of the cross-head. The cross-head may be operated by any suitable power-connections; but I prefer a pitman-and-crank connection receiving motion from any suitable power.

In the drawings I have shown pitman-and-crank connections K L, with each side of the cross-head and a gear-wheel on the crank-shaft meshing with a pinion, N, on the pulley-shaft, to which the power is applied. The strip or piece of wood of the proper width and thickness having been placed upon the table in position to be fed forward by the feed-rolls against the saws, and the machine set in motion, the cross-head will receive a continuous reciprocating motion, the feed-rolls an intermittent motion to feed the wood endwise against the saws, and the dipping-frame an intermittent movement to receive and clamp the splints, and the operation is continuous in these several steps. The cross-head having been raised to its highest point and the wood placed against the saws at their lowest ends, their descent will make the first cuts in the end of the wood, and thus allow the latter to be fed forward during the next ascending movement of the saws, thus placing the cut divisions of the wood between the saws. The cross-head then descending, the saws will again make cuts equal in depth to their oblique projection from a vertical line. The spur-cutters, by the continued descent of the cross-head, then cut each division of the wood on each side, taking off so much of each division as forms a match-splint, leaving it loosely within the space between the cutter-plates, with its end projecting above them. The divisions from which the splints are cut are supported upon corresponding divisions of the bed *a*, upon which the cut splints are held during the continued descent of the cross-head, so as to drive the splints up between the cutter-plates and above them a sufficient distance to be seized and held at the limit of the upward movement of the cross-head. In thus driving the splints up between the cutter-plates, they are held in the position to be seized, as stated, by means of a spring or springs, *x*, fastened across the upper end of the cross-head, and bearing against the projecting ends of the splints, so as to press them against the inner sides of the spur-cutters with sufficient force to hold the splints in place, but allow them to be easily drawn out from between the cutter-plates by the clamping action of the seizing-bars of the dipping-frame. For this purpose the force of the clamp of the seizing-bars must be greater than the force of the springs which hold the splints in place between the cutter-plates.

It will be understood that during the operation of severing the splints by the lateral spur-cutters they are at the same time, by reason of being supported upon the divisions *b* of the base *a* during the descent of the cross-head, forced upward between the cutter-plates against the recessed face of the cross-head and in contact with the holding-springs above the top of the cross-head, so that the upper ends of the splints are caused to project above the upper range of the spur-cutters, and the latter co-operate with the springs to hold the splints in proper position to be seized and held while the cross-head descends. Any number of saws can be used to produce any desired number of splints at a cut. The dipping-frame, when filled, is removed from the guideway to the dipping-troughs to be dipped into the match composition, and as the lower ends of the splints are ranged by the bed-divisions *b* in the same horizontal plane during the operation of cutting them, they will necessarily preserve this position in the dipping-frame and thus enter the liquid match preparation to a uniform extent. The dipping-frames are placed in the guideway in succession, so that an empty one immediately follows a filled one. The dipped matches, when dry, can be discharged from the frame into any suitable receiver by releasing the clamping action of the springs, which can be quickly done by taking hold of and releasing the pressure of the front bar upon the series of seizing-bars. A cam may be placed in the front cross-bar of the dipping-frame, so as to press against the front seizing-bar, and thus lock the series of bars together upon the splints, to insure the safe holding of the splints; but the tension of the springs should be sufficient to give the required clamping force to the bars to hold the splints, the bars being separated by the action of the cross-head cam-arms upon their toothed ends to receive the splints between them, and closed by the action of the springs to clamp the splints between the contiguous straight sides of the bars, and when so closed they hold the splints with a force sufficient to draw them from between the cutter-plates, it being understood that the splints are not held tightly by these plates, but by the springs bearing them against the inner sides of the spur-cutters. The feed of the dipping-frame must be regulated so as to bring the opening between the seizing-bars vertically in line with the row of splints held between and presented to the cutter-plates, so that the projecting ends of the splints will be carried between the seizing-bars.

It will be understood that the feed of the material is effected when the saws are at their highest point of movement, and that the saws move upward in the cuts previously made before the feed commences, so that the feed is always against the lowest ends of the saws, from which point their cutting-edges stand out obliquely from the face of the cross-head.

The cap-plate P serves to hold the splint-stuff properly to the saws, and it has an arm, P', which serves as a rest for the arm which carries the ratchet-pawl.

I claim—

1. The combination, in a match-machine, of the cross-head B, having a gang of vertical saws, and plates arranged in line above them, having lateral spur-cutters $i$ projecting from each side thereof, with a table-bed, $a$, having face divisions $b$ and a cross-slit, $c$, and means, substantially such as described, carried at the top of said cross-head, for holding the produced splints against the said spur-cutters in position to be delivered, as described.

2. The combination, in a match-machine, of the cross-head B, having a gang of saws, and vertical plates arranged above them, having lateral spur-cutters, with a table-bed, $a$, having face divisions $b$ and a cross-slit, $c$, substantially as described, for the purpose specified.

3. The combination, in a machine for producing match-splints, of a cross-head, B, having a gang of vertical saws, and plates arranged in line above them, having spur-cutters $i$ projecting from each side thereof, a table-bed, $a$, having face divisions $b$ and a cross-slit, $c$, and means, substantially such as described, carried by said cross-head, for holding the produced splints in position between the cutter-plates to be delivered, with a removable horizontally-moving dipping-frame adapted to seize and hold the splints, and a guideway open at both ends, adapted to receive, guide, and deliver the filled dipping-frame, substantially as set forth.

4. In a match-machine, the vertically-reciprocating cross-head B, constructed with a recessed face having vertical parallel grooves $e$, and provided with splint-cutting mechanism consisting of a gang of saws, $d$, suitably stretched and supported in said grooves, and plates forming a continuation of the saw-blades, having laterally-projecting spur-cutters $i$ arranged within the spaces between the plates, above said saws, combined with a table-bed, $a$, having face divisions $b$ and a cross-slit, $c$, substantially as described, for the purpose specified.

5. The combination, in a machine for producing match-splints, of a dipping-frame composed of an open rectangular frame having slotted side bars, $k$, a series of shouldered clamping-bars, $l$, fitted within the slotted side bars, and the springs $m'$, with the vertically-operating cross-head having a gang of saws, and plates arranged in line above them, having spur-cutters projecting from each side thereof, with means, substantially such as described, carried by said cross-head, for holding the splints in position to be delivered to said dipping-frame, and means, substantially such as described, for operating said clamping-bars and for feeding said dipping-frame in position to receive the splints.

6. The combination, with mechanism, substantially such as described, for feeding the wood, of the vertically-reciprocating cross-head B, having the gang of saws, and lateral spur-cutters arranged above them, and the table-bed $a$, having divisions $b$, corresponding with the spaces between the saws, and a cross-slit, $c$, substantially as described, for the purpose specified.

7. The combination, with mechanism, substantially such as described, for feeding the wood, the vertically-reciprocating cross-head B, having the gang of saws, and the lateral spur-cutters arranged above them, and the divided table-bed $a$, having the cross-slit $c$, of a dipping-frame of seizing-bars arranged above the cross-head, means, substantially as described, for opening and closing said bars to receive and hold the splints, and means, substantially as described, for advancing the dipping-frame to receive the splints from the cross-head.

8. In combination with the vertically-reciprocating cross-head B, having the saws $d$, and the lateral spur-cutters $i$, arranged as described, and the divided table-bed $a$, of the horizontal removable dipping-frame having clamping-bars $l$, adapted to be opened for receiving and holding the match-splints, the slotted guideway $l^4$, the feeding-bar J, having a spring-actuated pawl, $n$, adapted to engage with the toothed ends $m$ of said bars $l$, and means, substantially such as described, carried by said cross-head, for actuating said feeding-bar, whereby the said dipping-frame is moved over said cross-head, for the purpose described.

9. The combination, in a machine for producing match-splints, of the cross-head B, having the splint cutting and holding mechanism, substantially as described, of a removable horizontally-moving dipping-frame having seizing and clamping bars *l* arranged therein, and an open guideway for said dipping-frame, with the pivoted feeding-bar J, having a spring-actuated pawl, *n*, adapted to feed said frame, the spring-pawl *q*, adapted to engage with the seizing and clamping bars *l* for holding said frame, and means carried by said cross-head for operating the feeding-bar to move the dipping-frame, substantially as described, for the purpose specified.

10. The combination, in a match-machine, of the cross-head B, having the splint cutting and holding mechanism, substantially as described, with a seizing dipping-frame composed of separate toothed bars *l*, arranged to be fed over said cross-head, and means, substantially such as described, for operating the toothed seizing-bars of said dipping-frame, and for feeding it, consisting of the pivoted bar J, having the spring-actuated pawl *n*, the spring-actuated holding-pawl *q*, both said pawls acting upon the seizing parts, the tappet-arms *o p*, pivoted cams *r r*, and catches *u u*, carried by the cross-head, and the fixed inclined or curved projections *t t*, and trip-arms *w*; all constructed and arranged for operation substantially as described, for the purpose specified.

11. The combination, in a match-machine, of a horizontally-moving dipping-frame adapted to seize or grasp the splints in vertical position on its under side, with a vertically-reciprocating cross-head provided with saws, laterally-projecting spur-cutters, holding-plates for the splints, arranged on the face of the cross-head, and a spring or springs, *x*, arranged at the top of the cross-head, adapted to bear upon the projecting ends of the splints and press them against the inner sides of the spur-cutters *i*, to hold the splints in position for presentation to the seizing or grasping parts of the dipping-frame, substantially as described.

12. The combination, with intermittent feed mechanism for the splint-wood, and a table-bed, *a*, having face divisions *b* and cross-slit *c*, of a vertically-reciprocating cross-head, B, provided with saws *d*, arranged with their cutting-edges oblique to a vertical line, and having plates arranged above the saw-blades in lines coincident with them, formed with spur-cutters *i*, arranged to project laterally within the spaces between said plates in a vertical plane back of the cutting-edges of the saw-blades, substantially as described, for the purpose specified.

13. The cutting mechanism of a match-machine, consisting of a vertically-reciprocating cross-head or saw-frame, B, having a recessed back formed with parallel slits or grooves *e*, a gang of saws, *d*, secured within said grooves, spur-cutters *i*, arranged to project laterally within the spaces between the saw-blades, above the teeth thereof, and in a vertical plane back of the cutting-edges of said teeth, and means, substantially such as described, whereby the said saw-blades are removably secured within said grooves to the closed back of the cross-head, the said spaces between the saw-blades being open at the top and at the bottom, and the splints held between said cutter-plates in positions to be drawn out at their upper ends.

14. For operation in a match-machine constructed substantially as herein set forth, a reciprocating cutter consisting of two or more saw-blades having saw-teeth standing obliquely to a vertical line, and having one or more spur-cutters projecting from the opposite sides of each blade in vertical planes back of the vertical plane of the cutting-edges of the saw-teeth, and their points lapping in their vertical path between the blades, in combination with a suitable bed or support for the wood, having openings adapted to receive the saw-blades and the said spur-cutters after severing the splints, substantially as described.

15. The machine substantially hereinbefore set forth for making match-splints, comprising an intermittently-operating feed mechanism, a vertically-reciprocating cross-head, B, having a gang of saws, *d*, lateral spur-cutters *i*, and holding-plates for the splints, arranged above the saws, a horizontally-moving dipping-frame provided with means for seizing the splints, and a table-bed, *a*, having face divisions *b* and a cross-slit, *c*, and the holding-springs *x* for the splints, the several parts being constructed and arranged for operation substantially as described, for the purpose specified.

In testimony whereof I have hereunto set my hand in the presence of two subscribing witnesses.

GUS. A. FAAS.

Witnesses:
A. E. H. JOHNSON,
J. W. HAMILTON JOHNSON.